United States Patent
Masuya et al.

(10) Patent No.: US 8,289,841 B2
(45) Date of Patent: Oct. 16, 2012

(54) REDUNDANT GATEWAY SYSTEM

(75) Inventors: Yuzuru Masuya, Kanagawa (JP);
Takeshi Shimomura, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 961 days.

(21) Appl. No.: 12/345,955

(22) Filed: Dec. 30, 2008

(65) Prior Publication Data
US 2009/0252155 A1 Oct. 8, 2009

(30) Foreign Application Priority Data
Apr. 2, 2008 (JP) .................................. 2008-095795

(51) Int. Cl.
*H04L 1/00* (2006.01)
*H04L 12/56* (2006.01)
*H04L 12/66* (2006.01)
(52) U.S. Cl. ....................... 370/218; 370/352; 370/401
(58) Field of Classification Search .................... None
See application file for complete search history.

(56) References Cited

U.S. PATENT DOCUMENTS

| | | | |
|---|---|---|---|
| 6,963,353 B1* | 11/2005 | Firestone | 348/14.09 |
| 7,152,179 B1* | 12/2006 | Critchfield | 714/4.11 |
| 7,533,823 B2* | 5/2009 | Knowles et al. | 235/462.42 |
| 7,715,374 B2* | 5/2010 | Masuya et al. | 370/352 |
| 2002/0037002 A1* | 3/2002 | Mizusawa et al. | 370/352 |
| 2003/0037337 A1* | 2/2003 | Yona et al. | 725/95 |
| 2007/0183323 A1* | 8/2007 | Hannu et al. | 370/230 |
| 2008/0002669 A1* | 1/2008 | O'Brien et al. | 370/352 |

FOREIGN PATENT DOCUMENTS

JP 2005-057461 A 3/2005

* cited by examiner

*Primary Examiner* — Chi Pham
*Assistant Examiner* — Soon-Dong D Hyun
(74) *Attorney, Agent, or Firm* — Marvin A. Motsenbocker; Mots Law, PLLC

(57) ABSTRACT

First and second gateway devices perform TDM conversion on data from multiple packets supplied from the packet networks to generate TDM signals. A TDM exchange unit switches to the first gateway device from the second gateway device to supply the TDM network with only the TDM signal generated by the first gateway device. When the TDM exchange unit switches to the first gateway device from the second gateway device, a jitter buffer controller of the second gateway device notifies the first gateway device of the packet read order determined by the jitter buffer controller of the second gateway device, and the first gateway device determines a packet read order as the packet read order determined by the jitter buffer controller of the second gateway device.

11 Claims, 5 Drawing Sheets

REDUNDANT GATEWAY SYSTEM

CROSS REFERENCE TO RELATED APPLICATIONS

This application claims priority based on 35 USC 119 from prior Japanese Patent Application No. P2008-095795 filed on Apr. 2, 2008, entitled "REDUNDANT GATEWAY SYSTEM", the entire contents of which are incorporated herein by reference.

BACKGROUND OF THE INVENTION

1. Field of the Invention

The present invention relates to a redundant gateway system including multiple gateway devices provided between a single telephone network like a TDM network and multiple packet networks, like IP networks, which are simultaneously and concurrently operated.

2. Description of Related Art

Gateway devices are used, for example, to connect a telephone network and a packet network to each other. The gateway devices are often designed to form a duplex or more, redundant configuration to suppress effects on a user when one of the gateway devices breaks down. Usually, these redundant gateway devices operate with one device set as an active system and another device set as a standby system. Needless to say, the active and standby systems are switched therebetween when a failure occurs in the active system. Additionally, the active and standby systems periodically switch therebetween in preparation for a silence failure where it is difficult to pinpoint a failure. Japanese Patent Application Publication No. 2005-57461, for example, discloses a method for avoiding interruption of communication at the time of this system switching.

However, in the disclosed technique described above, the standby system takes over from the active system, only part of RTP/RTCP session information and connectivity information, which are transmitted to a packet network, excluding a time stamp (TS) value and a sequence number (SN) value. Accordingly, the time stamp and sequence number values are discontinuous in RTP packets received by a receiver on the packet network side, and therefore a conflict with a telephone communication, which means instantaneous discontinuity of the telephone communication, cannot be avoided. On the other hand, during processing of voice on voice packets received from the packet network, with subsequent output of voice packets to a telephone network as voice data, the active system and the standby system cannot be synchronized. As a result, conflict between the telephone communication and duplication of voice are caused by the system switching.

This conflict particularly arises where multiple gateway devices of redundant configuration are respectively connected to multiple packet networks redundantly configured to form multiple systems. In this case, deficits, fluctuations, and delays of the packets that are concurrently transmitted from the multiple packet networks differ among the systems. Accordingly, in the system switching between multiple gateway systems, the system switching must be implemented without conflicts. That is, timing of voice data output from the multiple gateway systems must be adjusted while completely eliminating a drop of data. However, the conventional art does not implement the system switching without such conflicts.

SUMMARY OF THE INVENTION

An aspect of the invention provides a redundant gateway system that comprises: at least first gateway device and second gateway device positioned between a TDM network and a plurality of packet networks with multiplex structure, and configured to perform TDM conversion on data from multiple packets supplied from the packet networks to generate TDM signals, the plurality of the gateway devices includes at least a first gateway device and a second gateway device; and a TDM exchange unit configured to switch to the first gateway device from the second gateway device of the plurality of gateway devices to supply the TDM network with only the TDM signal generated by the first gateway device, wherein each of the at least first and second gateway devices includes: a packet interface connected with any of the plurality of packet networks and configured to capture a packet supplied from the connected packet network based on a physical address of the packet; a jitter buffer configured to sequentially store data from each packet captured through the packet interface; and a jitter buffer controller configured to determine a packet read order, read the data stored in the jitter buffers in accordance with the determined packet read order, and supply the thus-read data to the TDM conversion processing, wherein when the TDM exchange unit switches to the first gateway device from the second gateway device, the jitter buffer controller of the second gateway device notifies the first gateway device of the packet read order determined by the jitter buffer controller of the second gateway device, and the first gateway device determines a packet read order as the packet read order determined by the jitter buffer controller of the second gateway device.

DETAILED DESCRIPTION OF PREFERRED EMBODIMENTS

Embodiments of the invention are described in detail with reference to the accompanying drawings.

First Embodiment

Figure 1:
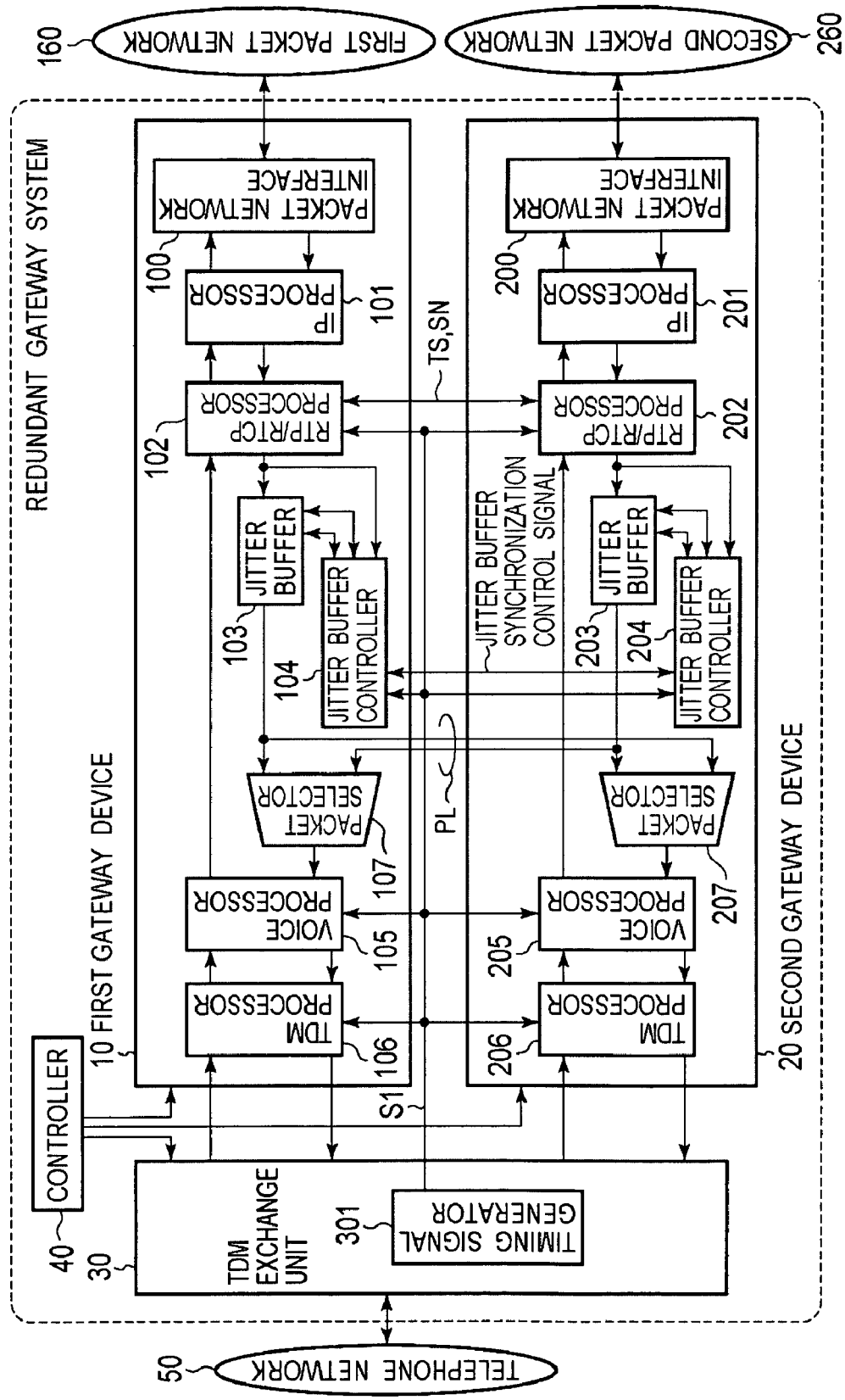
FIG. 1 is a block diagram of a redundant gateway system and a network configuration connected to this redundant gateway system, according to a first embodiment.

FIG. 1 shows a redundant gateway system and a network configuration connected thereto, according to a first embodiment. A redundant gateway system of the embodiment is provided between telephone network 50, which is a TDM network, the first packet network 160, and the second packet network 260, which are packet networks that form a redundant configuration of an active system and a standby system. The redundant gateway system includes: at least two gateway devices, such as the first gateway device 10 and the second gateway device 20, forming a redundant configuration having multiple systems; controller 40; and TDM exchange unit 30. The first gateway device 10 and the second gateway device 20 have an identical internal configuration.

The first gateway device 10 and the second gateway device 20 respectively connect to the first packet network 160 and the second packet network 260 that configure the active system and the standby system. The first gateway device 10 transmits and receives a packet to and from the first packet network 160, while the second gateway device 20 transmits and receives a packet to and from the second packet network 260. Usually, irrespective of whether the first gateway device 10 and the second gateway device 20 are set as the active system or the standby system, the first gateway device 10 and the second gateway device 20 always can communicate with its corresponding packet network.

The first gateway device 10 includes packet network interface 100, IP processor 101, RTP/RTCP processor 102, jitter buffer 103, jitter buffer controller 104, voice processor 105, TDM processor 106, and packet selector 107. Similarly, the second gateway device 20 includes packet network interface part 200, IP processor 201, RTP/RTCP processor 202, jitter buffer 203, jitter buffer controller 204, voice processor 205, TDM processor 206, and packet selector 207.

Since the internal configurations of the first gateway device 10 and the second gateway device 20 have an identical connection and configuration, only the first gateway device 10 will be described below for sake of brevity. Additionally, the description below primarily shows a function configuration in which a packet is received from the first packet network 160, and voice data is outputted to telephone network 50. Of course, however, gateway devices 10 and 20 include functions of receiving voice data from telephone network 50, packetizing the voice data, and transmitting the packets to the first packet network 160 or the second packet network 260.

Packet network interface 100 is connected to IP processor 101 and receives a packet from the first packet network 160. Packet network interface 100 receives only the packet addressed to a physical address of its own system set in advance by controller 40, and supplies packet data to IP processor 101.

IP processor 101 is connected to RTP/RTCP processor 102. Among the received packet data, IP processor 101 receives only packet data addressed to an IP address of its own system set in advance by controller 40. IP processor 101 confirms header information and correctness of the packet data as needed, and supplies valid packet data to RTP/RTCP processors 102 and 202.

RTP/RTCP processor 102 is connected to jitter buffer 103, jitter buffer controller 104, and voice processor 105. From the received packet data, RTP/RTCP processor 102 extracts information capable of identifying the packet, such as a port number, a sequence number, a time stamp, a synchronization source (SSRC) identifier. RTP/RTCP processor 102 supplies this extracted information to jitter buffer 103 and jitter buffer controller 104 of the system together with the voice data of a payload part (hereinafter, simply referred to as data). For synchronization of RTP/RTCP processing, RTP/RTCP processor 102 is also interconnected to the other system RTP/RTCP processor 202 across the systems. Time stamp TS and sequence number SN are supplied from the RTP/RTCP processor of the gateway device set as the active system to the RTP/RTCP processor of the gateway device set as the standby system. Here, time stamp TS and sequence number SN are used when the voice data from telephone network 50 is packetized.

Jitter buffer controller 104 has a function to control write and read to jitter buffer 103. Jitter buffer controller 104 determines whether the data supplied from RTP/RTCP processor 102 are saved in jitter buffer 103. When determining that the supplied data are to be saved, jitter buffer controller 104 performs write control operation to jitter buffer 103. Jitter buffer controller 104 is also interconnected with jitter buffer controller 204 across the systems to transmit and receive a jitter buffer synchronization control signal between each controller. The content of the jitter buffer synchronization control signal is set to a value of the sequence number SN and a value of the time stamp TS, of the data to be read from the jitter buffer.

To simplify address administration, jitter buffer 103 has a configuration in which a storage area is divided into voice processing units for each channel. Jitter buffer 103 writes the data supplied from RTP/RTCP processor 102 into an unwritten area or a free area where the written data is already read out. Jitter buffer 103 is connected to packet selector 107 and to packet selector 207 of the other system through packet confounding line PL, so as to supply the read data to packet selector 107 as well as to packet selector 207 of the other system.

Packet selector 107 is connected to voice processor 105. Packet selector 107 selects either data from jitter buffer 103 or data from jitter buffer 203 and supplies thus-selected data to voice processor 105. Voice processor 105 is connected to TDM processor 106. Voice processor 105 performs voice processing, such as codec conversion, on data supplied from packet selector 107 and supplies thus-processed data to TDM processor 106. TDM processor 106 is connected to TDM exchange unit section 30. TDM processor 106 generates a TDM signal by performing TDM conversion processing on the data on which voice processing has been performed, and supplies the TDM signal to TDM exchange unit section 30.

Controller 40 is connected to the first gateway device 10, the second gateway device 20, and TDM exchange unit 30. Upon request for system switching due to a system failure or for maintenance, controller 40 performs system switching operation via a command operation from the outside or an automatic processing based on failure detection. Controller 40 also sets in advance, for each of gateway devices 10 and 20, packetization information needed during RTP packetization of the voice data and information needed for connection with the first packet network 160 and the second packet network 260, including the physical address and the IP address. The packetization information includes packet size and communication destination information.

TDM exchange unit 30 is connected between telephone network 50 and TDM processors 106 and 206. TDM exchange unit 30 exchanges transmitting and receiving of the TDM signal between telephone network 50 and either the first gateway device 10 or the second gateway device 20. TDM exchange unit 30 includes timing signal generator 301 for synchronizing speech processing timing. Timing signal generator 301 supplies reference timing signal S1 to each part included in gateway devices 10 and 20, that is, to TDM processors 106 and 206, voice processors 105 and 205, jitter buffer controllers 104 and 204, and RTP/RTCP processors 102 and 202. The reference timing signal S1 is synchronized with a frame of the TDM signal.

Figure 2:
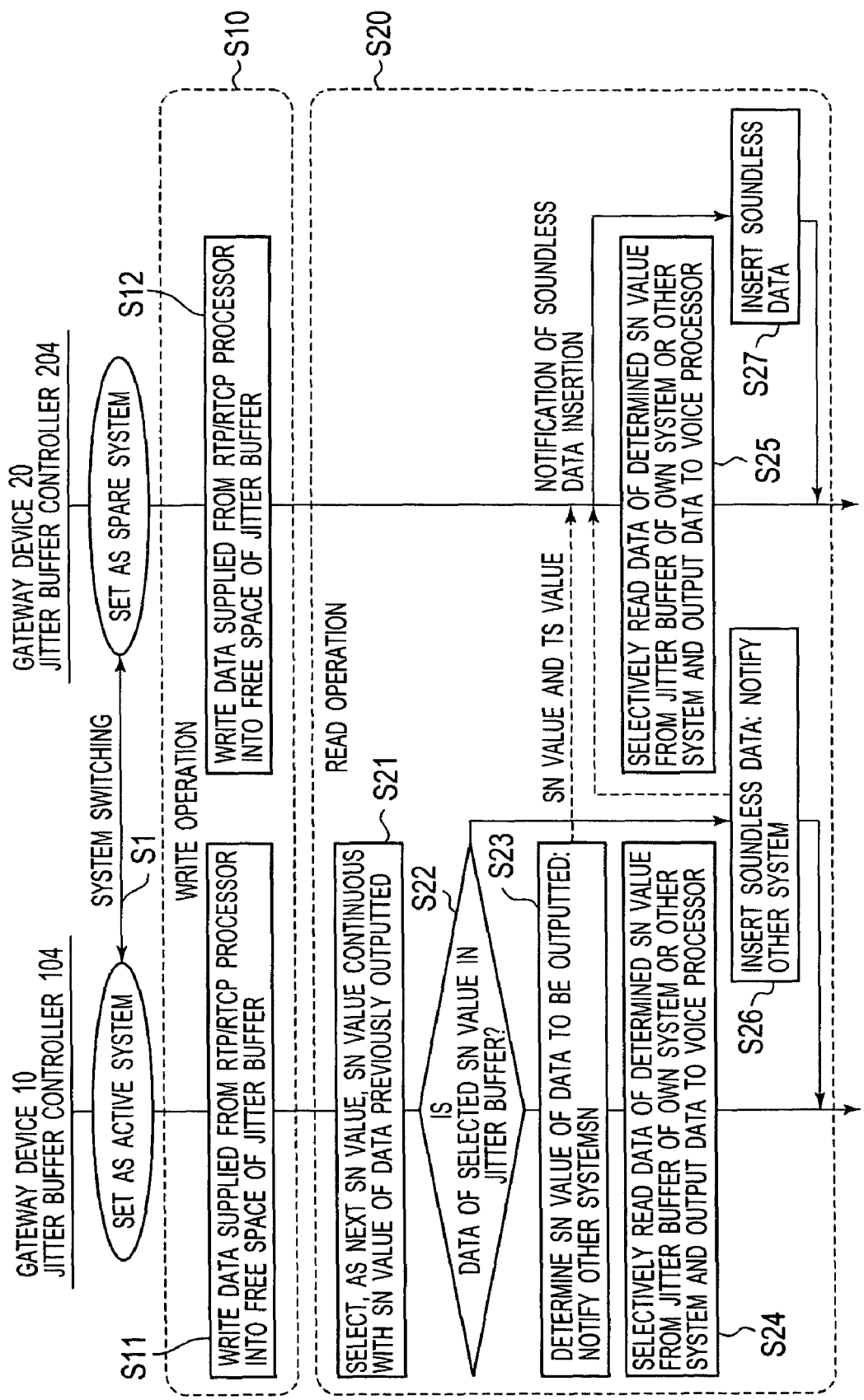
FIG. 2 is a sequence diagram showing an operation of the redundant gateway system, according to the first embodiment.

FIG. 2 shows operation procedures in the first embodiment. Hereinafter, the operation procedures will be described with reference to components shown in FIG. 2 where relevant. Here, the operation from receiving a packet from the first packet network 160 and the second packet network 260 to outputting voice data to telephone network 50 is shown. The first gateway device 10 and the second gateway device 20 form a redundant configuration.

First, gateway devices 10 and 20 are alternatively set as the active system or the standby system by a control signal from controller 40 (Step S1). As shown in the drawing, the first packet network 160 is set as the active system, and the second packet network 260 is set as the standby system, for example. Corresponding to this, the first gateway device 10 is set as the active system, and the second gateway device 20 is set as the standby system. Two gateway devices 10 and 20 are always connected to TDM exchange unit 30, irrespective of the setting of the active system or the standby system. As a result, TDM exchange unit 30 selects a TDM signal carrying voice data from the first gateway device 10, which is the active system gateway device, according to the setting from controller 40, and outputs the TDM signal to telephone network 50.

Now, in a writing operation of Step S10, based on control of jitter buffer controller 104, the first gateway device 10 writes data supplied from RTP/RTCP processor 102 into a free space of jitter buffer 103 (Step S11). Concurrently, based on control of jitter buffer controller 204, the second gateway device 20 also writes data supplied from RTP/RTCP processor 202 into a free space of jitter buffer 203(Step S12).

In a reading operation of Step S20, in order to determine data to be outputted, the first gateway device 10 set as the active system selects, as a next SN value, an SN value continuous with an SN value of data outputted immediately before, in other words, data outputted previously (Step S21). Subsequently, the first gateway device 10 determines whether the jitter buffer of either system contains data having the selected SN value (Step S22). When the first gateway device 10 searches for data with the selected SN value and finds the data stored in jitter buffer 103, the first gateway device 10 directs the data to be outputted next. Simultaneously, the first gateway device 10 notifies the second gateway device 20 of the standby system of the SN value and a TS value of the determined data as the jitter buffer synchronization control signal (Step S23). When the data are not stored in jitter buffer 103, the first gateway device 10 searches for the data having the selected SN value in jitter buffer 203 of the second gateway device 20 set as the standby system. When the data are saved in jitter buffer 203 of the second gateway device 20 set as the standby system, the first gateway device 10 determines the data as read data, and simultaneously, notifies the second gateway device 20 of the standby system of the SN value and a TS value of the determined data (Step S23).

Selection of output data by jitter buffer controller 104 or 204 means the determination of order of the data that is provided for voice processing, i.e., packet read order of the packet carrying the voice data.

In response to the selection of data to be outputted, the first gateway device 10 selectively reads the data having the determined SN value from the jitter buffer of either the same system or another system, and outputs the data to the voice processor (Step S24). Concurrently, the second gateway device 20 also selectively reads the data having the determined SN value from the jitter buffer of the same system or another system, and outputs the data to the voice processor (Step S25). Here, selective read-out of the data across the different systems is executed by selection operation of packet selectors 107 and 207 respectively connected to jitter buffer 103 and jitter buffer 203. Through received packet confounding line PL, the jitter buffer output data are passed from both of jitter buffers 103 and 203. This allows each of gateway devices 10 and 20 to select the jitter buffer output data of the other system for substitution.

On the other hand, when the data having the selected SN value are saved neither in the jitter buffer of the own system nor in the jitter buffer of the other system at Step S22, the first gateway device 10 inserts silence data (null data) a predetermined number of times (or periods), and simultaneously, notifies the second gateway device 20 of the standby system of the insertion of the silence data (Step S26). In response to this notification, the second gateway device 20 of the standby system similarly inserts the silence data (Step S27). Here, when data having the selected SN value is saved neither in the jitter buffer of the own system nor in the jitter buffer of the other system, fluctuation of the packet or lack of the packet occurs on the first packet network 160 or the second packet network 260. Due to the influence, the data to be outputted having the SN value being a continuous value are saved in neither of jitter buffers 103 and 203. In addition, when the SN value of the data inputted into jitter buffer 103 or 203 exceeds a predetermined value that generates a large discontinuity, a determination is made regarding effectiveness of the data. Then, when the data is deemed ineffective, a processing similar to the above case may be executed, that is, the data of the other system is substituted or the silence data is substituted.

Figure 3:
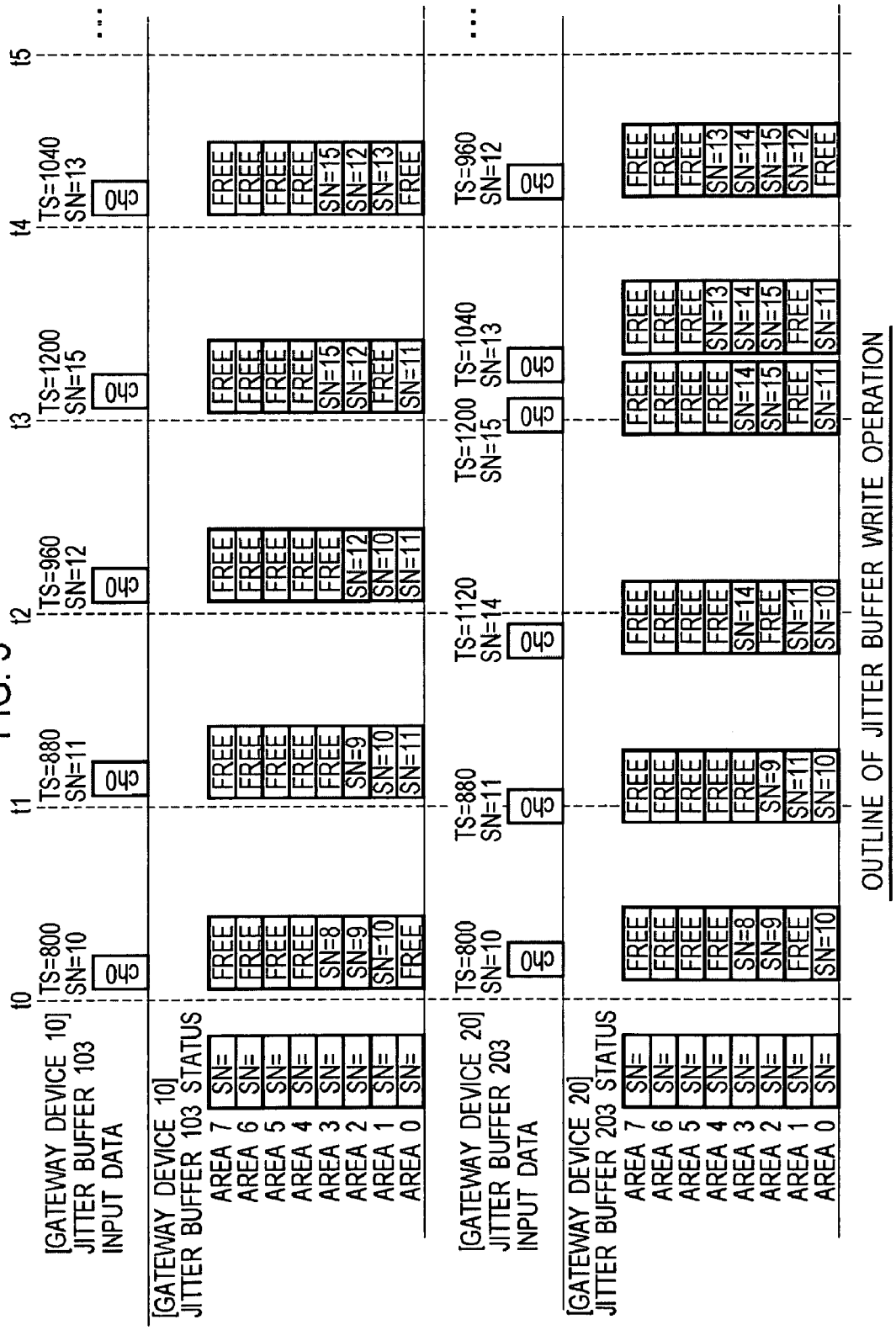
FIG. 3 is a diagram exemplifying a writing operation of a jitter buffer.
Figure 4:
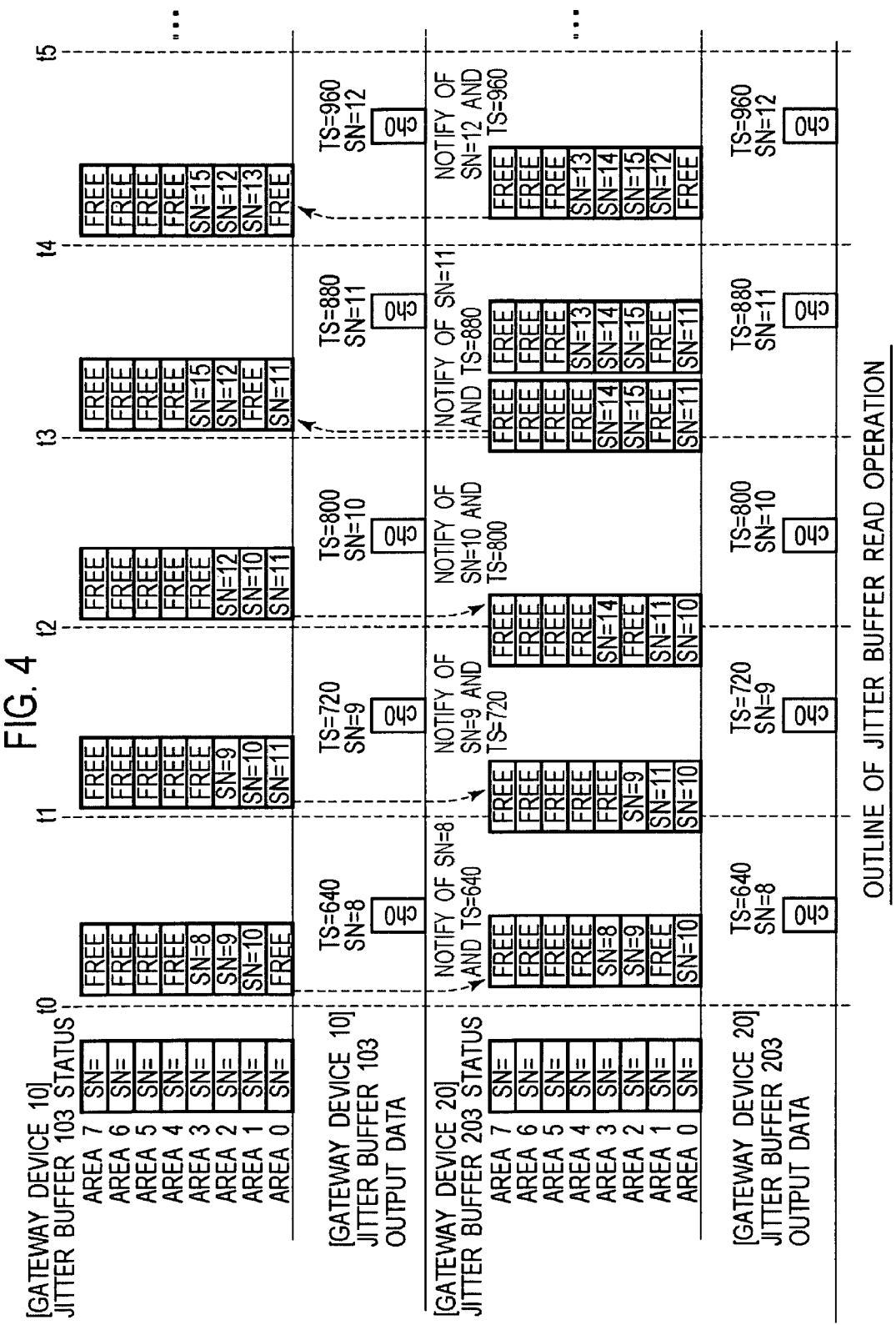
FIG. 4 is a diagram exemplifying a reading operation of the jitter buffer.

FIGS. 3 and 4 each show actual examples of operation of writing into the jitter buffer and operation of reading from the jitter buffer, performed under control of the jitter buffer controller in both systems.

Referring to FIG. 3, each writing operation in jitter buffers 103 and 203 is shown. In each of jitter buffers 103 and 203, a storage area is divided into voice processing units for easy address administration. For example, the storage area includes eight areas 0 to 7 as shown in FIG. 3. The data supplied from each of RTP/RTCP processors 102 and 202 are written in an unwritten area, or a free space where written data has already been outputted to voice processors 105 and 205. FIG. 3 shows the state where three (3) to four (4) packets are accumulated on an average in order to absorb the jitter (fluctuation) generated in the first packet network 160 and the second packet network 260. Each of timings t0 to t5 is synchronized with the reference timing signal S1. An SN indicates a value of sequence number SN of the data, and a TS indicates a value of time stamp TS of the data.

Assume that, at timing t0, previously inputted data of SN=8 and SN=9 are written and saved in given areas in jitter buffers 103 and 203. Then, data of SN=10 and TS=800 are newly inputted into jitter buffer 103, and are written in area 1 of jitter buffer 103. On the other hand, the identical data of SN=10 and TS=800 are written in area 0 of jitter buffer 203.

Next, at timing t1, data of SN=11 and TS=880 are inputted into jitter buffer 103, and are written in area 0 of jitter buffer 103. On the other hand, the identical data of SN=11 and TS=880 are written in area 1 of jitter buffer 203.

Then, at timing t2, data of SN=12 and TS=960 are inputted into jitter buffer 103, and are written in area 2 of jitter buffer 103. On the other hand, data of SN=14 and TS=1120 are written in area 3 of jitter buffer 203. The new data of SN=14 and TS=1120 written in jitter buffer 203 are discontinuous from the previous data, and exemplifies the case wherein a certain packet delay or deficit occurs. Hereinafter, after timing t3, the data are written in jitter buffer 103 and jitter buffer 203 in a similar manner.

Referring to FIG. 4, the reading operation of jitter buffers 103 and 203 is shown. The data from jitter buffer 103 and data from jitter buffer 203 are outputted at the same timing on the basis of the reference timing S1.

Assume that, at timing t0 (which coincides with timing t0 shown in FIG. 3), the first gateway device 10 of the active system determines the data of SN=8 (TS=640) already saved in jitter buffer 103 as the data to be outputted next. Simultaneously, the first gateway device 10 notifies the second gateway device 20 of the standby system that the data of SN=8 (TS=640) are outputted next, using a jitter buffer synchronization control signal interconnected between the systems. Simultaneously, the first gateway device 10 outputs the data of SN=8 (TS=640) from jitter buffer 103. Concurrently, in response to the notification, the second gateway device 20 of the standby system also outputs the data of SN=8 (TS=640) from jitter buffer 203 at timing t0 according to the first gateway device 10.

Next, at each of timing t1 and timing t2, similar processing to that performed at timing t0 are executed in both systems to output data.

Then, assume that, at timing t3, system switching is executed in which the first gateway device 10 that has been the active system is switched to the standby system, and the second gateway device 20 that has been the standby system is switched to the active system. Immediately before system switching, the second gateway device 20 determines SN=11 as the SN value continuous with the SN value SN=10 of the read data notified by the first gateway device 10. The second gateway device 20 notifies the first gateway device 10 newly operating as the standby system of this determination, and outputs the data of SN=11 (TS=880) from jitter buffer 203. Concurrently, in response to the notification, the first gateway device 10 of the standby system also outputs the data of SN=11 (TS=880) from jitter buffer 103 at timing t3 according to the second gateway device 20.

As mentioned above, even after the system switching, the second gateway device 20 that has newly become the active system can easily determine the continuous data. In the case where the first gateway device 10 is set as the active system and the second gateway device 20 is set as the standby system, even when a maintenance technician stops the operation of the second gateway device 20 of the standby system for replacement, etc., and subsequently, newly incorporates an additional gateway device and operates the gateway device, the first gateway device 10 of the active system notifies the additional gateway system of the SN value of the data for fresh reading from the jitter buffer in the additional gateway device. Thereby, synchronized output is easily allowed also in the additional gateway device.

Thus, the output data is determined according to the jitter buffer synchronization control signal, such as the sequence number that is accompanied with the input data and allows identification of the continuity of the data. Moreover, the output data is read according to reference timing signal S1, which is uniquely determined through the whole system including the TDM network. As a result, data completely synchronized between the systems can be supplied to voice processors 105 and 205.

As mentioned above, according to the first embodiment, gateway devices 10 and 20 are in a state that is capable of communicating with connected the first packet network 160 and the second packet network 260, respectively, having the redundant configuration. Gateway devices 10 and 20 are operated so as to save the normal packet received by the gateway device of its own in the jitter buffer of its own, to pass information, including the sequence number of the data, to each other as the jitter buffer synchronization control signal synchronized with the reference timing signal S1, to pass the data, outputted from the jitter buffer through the received packet confounding line, to each other at the processing timing in accordance with the reference signal, and to select one of the packets at the packet selectors. Thereby, the continuous voice data synchronized between active system the first gateway device 10 and standby system the second gateway device 20 are supplied to voice processors 105 and 205 without lack of the received packet. Therefore, system switching without collision is attainable also in system switching including packet network interfaces 100 and 200.

Furthermore, since the first gateway device 10 of the active system and the second gateway device 20 of the standby system commonly hold all the effective voice data received by each gateway device, it is possible to perform system switching of connected the first packet network 160 and the second packet network 260 having the redundant configuration, separately from system switching of gateway devices 10 and 20 having the redundant configuration. Thereby, system switching without a conflict with a telephone communication is easily attained without using any special network switch device. Therefore, since the gateway device no longer requires knowledge of whether the packet network is of the active system or the standby system, packet network maintainability largely improves in addition to the maintainability of the gateway device.

While the packet read order is determined based on continuity of the value of sequence number SN accompanied by data in the first embodiment, the value of time stamp TS may be used instead of sequence number SN. Additionally, while the first embodiment description was based on the premise that the gateway device processes the voice data of a single voice channel, the invention is not limited to this embodiment and is also applicable to a gateway device that processes the voice data of multiple channels.

Second Embodiment

Figure 5:
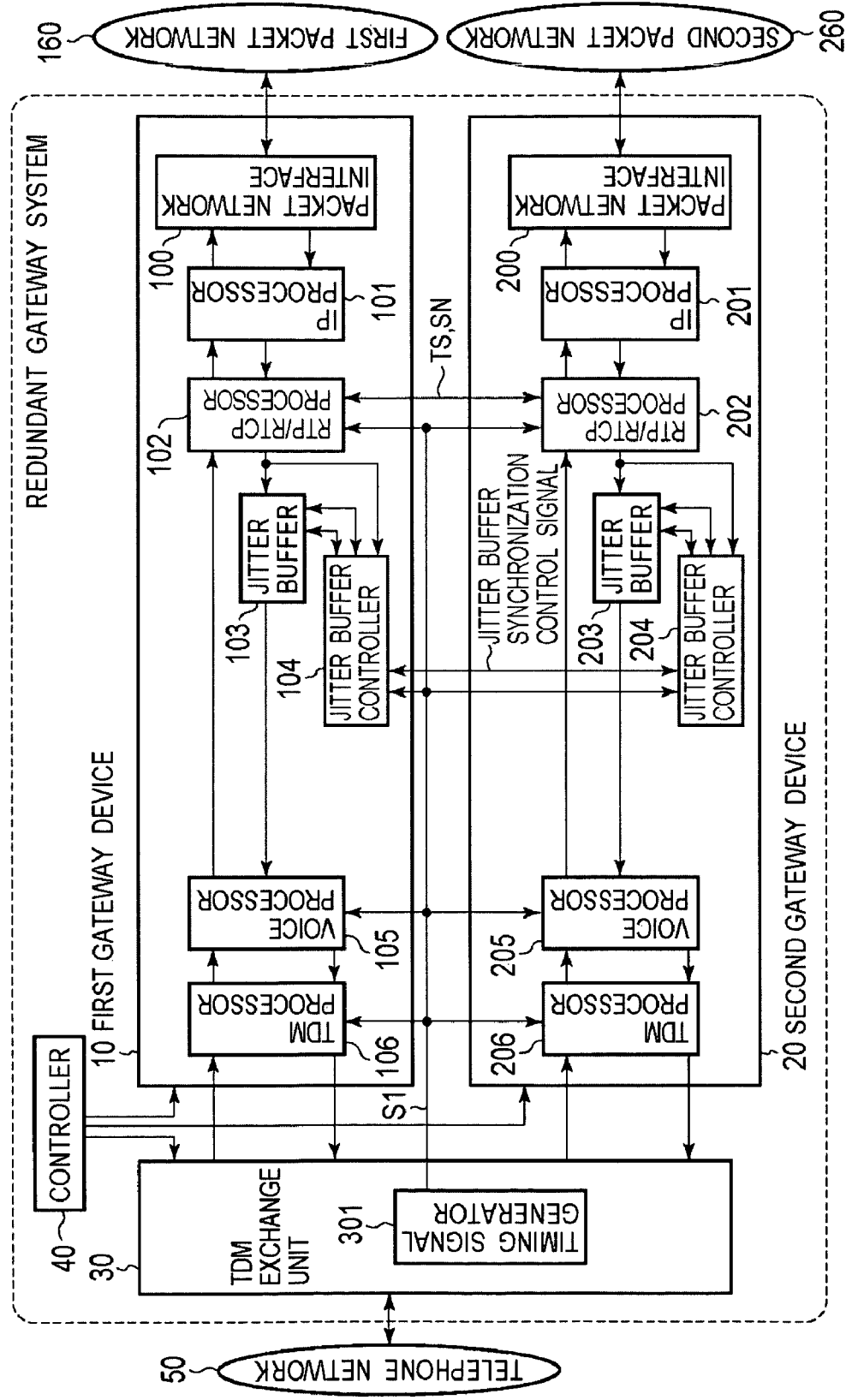
FIG. 5 is a block diagram of a redundant gateway system and a network configuration connected to this redundant gateway system, according to a second embodiment.

FIG. 5 shows a second embodiment according to the invention, and shows a redundant gateway system and a network configuration connected thereto. Although the configuration is basically the same as the configuration of the first embodiment, packet selectors 107 and 207 are removed from the configuration of the first embodiment, and the received packet confounding line connected across the systems is not included in the configuration according to the second embodiment.

Operation procedures in the configuration shown in FIG. 5 will be described with special attention to differences from the first embodiment. In the writing operation of data in the jitter buffer, the first gateway device 10 and the second gateway device 20 perform the writing operation similar to that in the first embodiment.

On the other hand, in reading data from the jitter buffer, when determining the data to be outputted in the same manner as in the first embodiment, the gateway device set as the active system, for example, the first gateway device 10, determines the data to be outputted next by determining whether there is selected data in the jitter buffer of the same system. Subsequently, the first gateway device 10 notifies the second gateway device 20 of the standby system of this determination. In response to the determination of the data to be outputted, each of gateway devices 10 and 20 always reads the data from the jitter buffer of the same system to output the data to the voice processor. Of course, when the jitter buffer of the same system has no selected data, the processing may be performed the same as the processing in the first embodiment, that is, the silence data may be substituted.

The above-mentioned operation procedures are based on the premise that the first packet network 160 and the second packet network 260, to which gateway devices 10 and 20 respectively connect are high quality networks that hardly generate fluctuation in packet arrival or lack of packets. In a configuration where such a premise is appropriate, switching without conflicts can also be attained by inputting, to the TDM exchange unit both of the output TDM signal of the first gateway device 10 and the output TDM signal of the second gateway device 20 at the same timing obtained by synchronizing to reference timing signal S1.

As mentioned above, in the second embodiment, since the packet selector or the received packet confounding line is not required, switching without a conflict can be implemented more easily compared with the case of the first embodiment. Therefore, when multiple packet networks connected to the redundant gateway system and multiple gateway devices are connected one to one in a fixed manner, a configuration in which the TDM exchange unit collectively performs system selection can be implemented more easily.

While the gateway device that performs voice processing has been exemplified above, the invention can be widely used when a non-conflict system switching is needed in a redundant gateway system that has a data communication packet network as well as voice.

Furthermore, while the above-mentioned embodiments have been described using a communication configuration in which transfer is performed on the IP protocol, transfer protocols used are not limited to the IP protocol. The embodiments also apply to other packet protocols, such as ATM (Asynchronous Transfer Mode) and FR (Frame Relay). Moreover, while the data of the single voice channel has been described in the embodiments mentioned above, the redundant gateway system according to the embodiments also applies to a gateway device that processes the voice data of multiple channels. While descriptions have been predicated on two packet networks and two gateway devices, the embodiments also apply to a redundant gateway system for not less than two packet networks, thus including not less than two gateway devices.

According to the redundant gateway system of an embodiment, in a redundant gateway system composed of multiple gateway devices provided between a single telephone network and packet networks concurrently operated and having the redundant configuration, at the time of system switching of the gateway devices, lack of the packet is avoided, and conflict free system switching is implemented.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A redundant gateway system comprising:
    a plurality of gateway devices including at least first gateway device and second gateway device positioned between a time division multiplexing (TDM) network and a plurality of packet networks with multiplex structure, and configured to perform TDM conversion on data from multiple packets supplied from the packet networks to generate TDM signals; and
    a TDM exchange unit configured to switch to the first gateway device from the second gateway device of the plurality of gateway devices to supply the TDM network with only the TDM signal generated by the first gateway device, wherein each of the at least first and second gateway devices includes:
    a packet interface connected with one of the plurality of packet networks and configured to capture a packet supplied from the connected packet network based on a physical address of the packet;
    a jitter buffer configured to sequentially store data from each packet captured through the packet interface; and
    a jitter buffer controller configured to determine a packet read order, read the data stored in the jitter buffer in accordance with the determined packet read order, and supply the thus-read data for the TDM conversion, wherein
    when the TDM exchange unit switches to the first gateway device from the second gateway device, the jitter buffer controller of the second gateway device notifies the first gateway device of the packet read order determined by the jitter buffer controller of the second gateway device, and the first gateway device determines the same packet read order as the packet read order determined by the jitter buffer controller of the second gateway device.

2. The system of claim 1, wherein each of the first and second gateway devices further includes a real time transport protocol/real time transport control protocol (RTP/RTCP) processor, the RTP/RTCP processor of the first gateway device interconnected to the RTP/RTCP processor of the second gateway device across the systems for synchronization of RTP/RTCP processing, and sending time stamp and sequence number.

3. The system of claim 1, further comprising a controller that performs a system switching operation via a command operation from the outside or by an automatic processing based on failure detection.

4. The system of claim 3, wherein the first and the second gateway devices are connected to the TDM exchange unit all the time, and the TDM exchange unit selects one of the TDM signals transmitted from the first and the second gateway devices in response to setting of the controller that performs the system switching.

5. The system of claim 1, further includes a received packet confounding line, which is connected to both of the jitter buffers of the first and the second gateway devices, so that output from the jitter buffer of the second gateway device is transmitted to the first gateway device and output from the jitter buffer of the first gateway device is transmitted to the second gateway device, whereby each gateway device can select one of the outputs transmitted from the jitter butters of the first and second gateway devices.

6. The system of claim 1, wherein in response to the determination of the packet reader order, each of first and second gateway devices always reads the data from its own jitter buffer to output the data.

7. The system of claim 1, wherein the jitter buffer controller determines the packet read order based on at least one value of a sequence number and a time stamp that are given to the packet.

8. The system of claim 1, wherein, when each of the plurality of gateway devices determines that its own jitter buffer lacks certain data of a packet according to the determined packet read order, each gateway device reads and captures data of a packet of an identical content from the jitter buffer of another gateway device and substitutes the data as own data.

9. The system of claim 1, wherein, when each of the plurality of gateway devices determines that its own jitter buffer lacks certain data of a packet according to the determined packet read order, each gateway device substitutes null data for the certain data.

10. The system of claim 1, wherein, when each of the plurality of gateway devices determines that neither the own jitter buffer nor the jitter buffer of the other gateway device lacks the certain data, gateway device substitutes null data for the certain data.

11. The system of claim 1, wherein
the TDM exchange unit includes a timing signal generator configured to generate a reference timing signal synchronized with a frame of the TDM signal, and
each gateway device reads data from the device's own jitter buffer at a timing synchronized with the reference timing signal.

* * * * *